United States Patent
Roberts (10) Patent No.: US 7,313,471 B2
(45) Date of Patent: Dec. 25, 2007

(54) METHOD AND SYSTEM FOR EXTENDING THE LIFE OF A VEHICLE

(76) Inventor: James H. Roberts, 205 Singing J, Longview, TX (US) 75605

( * ) Notice: Subject to any disclaimer, the term of this patent is extended or adjusted under 35 U.S.C. 154(b) by 220 days.

(21) Appl. No.: 11/026,648

(22) Filed: Dec. 31, 2004

(65) Prior Publication Data

US 2006/0149438 A1    Jul. 6, 2006

(51) Int. Cl.
*G01M 17/00*    (2006.01)
*G06Q 30/00*    (2006.01)

(52) U.S. Cl. .............. 701/29; 701/30; 701/1; 705/1; 705/14

(58) Field of Classification Search .......... 701/1, 701/29–31; 702/183–185; 705/1, 4, 14, 705/8, 28–29
See application file for complete search history.

(56) References Cited

U.S. PATENT DOCUMENTS 6,694,234 B2 *    2/2004    Lockwood et al. .......... 701/29

\* cited by examiner

*Primary Examiner*—Yonel Beaulieu
(74) *Attorney, Agent, or Firm*—Edwin S. Flores; Chalker Flores, LLP (57) ABSTRACT

The present invention provides a system, a computer program and a method of increasing the usable life of a new vehicle including providing a warranty for the life of the new vehicle to a user, providing a maintenance schedule for the new vehicle to the user and repairing a mechanical breakdown of one or more covered parts at an authorized facility with a minimal cost to the user whenever the warranty has not been voided by an occurrence of a trigger event, the new vehicle has been routinely examined by the authorized facility, and all maintenance of the new vehicle specified in the maintenance schedule has been performed at the authorized facility.

34 Claims, 6 Drawing Sheets

METHOD AND SYSTEM FOR EXTENDING THE LIFE OF A VEHICLE

TECHNICAL FIELD OF THE INVENTION

The present invention relates generally to vehicle repair and maintenance, and in particular, to a method of increasing the usable lifetime of a vehicle.

BACKGROUND OF THE INVENTION

Without limiting the scope of the invention, its background is described in connection with vehicle maintenance, as an example. No matter the type of vehicle: car, truck, SUV, boat or airplane, the level of maintenance can determine its longevity, performance and reliability. Vehicle maintenance is one of the most important aspects of vehicle ownership; however, vehicular maintenance is also one of the most neglected areas of vehicle ownership.

Newer vehicles can accumulate many miles without showing outward signs of wear and tear, thus, creating the misconception that the vehicle is still new and does not need maintenance. For example, many people purchase new vehicles prior to a trip or vacation adding thousands of miles in a matter of months, and then fail to perform an oil change or other maintenance as required as the car is only a few months old.

Additionally, some owners find the high-tech computer-controlled systems of new vehicles confusing or intimidating and put-off maintenance until something goes wrong. Still other owners are under the misconception that new vehicles do not need maintenance. Some people who purchase a new car believe that all they have to do is fill it with gas, change the oil and drive it. Often, the user expects the vehicle to last 5 to 10 years until they trade it for a new car.

Furthermore, engines and transmissions used in new vehicles have improved over their predecessors and the advanced ignition and fuel injection system of newer vehicles have virtually eliminated the traditional tune-up, e.g., adjusting carburetors, installing points and setting the timing. These facts have created the misconception that cars are like washing machines or refrigerators, operating for years with little or no maintenance, and that is simply not the case. These systems must still undergo some form of maintenance to provide reliably operation.

Vehicle maintenance involves a variety of different maintenance procedures including: checking the battery, checking the electrical system, keeping a check on the oil and fluids and changing the oil spark plugs, filters and fluids. Generally, the manufacturer includes a recommended maintenance schedule for specific maintenance items at given times and/or mileages; these maintenance schedule are often listed in the owner's manual. For example, the suggested maintenance intervals of, e.g., every 12,000 miles or 300 hours of engine operation (e.g., tune-up, inspect chassis, brakes steering linkages, suspension, ball joints, replace fluids, change oil, replace the oil filter, check/change differential fluids, change spark plugs, change ignition wires, etc.) for major services and other minor service every 3,000 to 6,000 miles (or hour equivalent) (e.g., change oil and oil filter, inspect fluids, inspect brakes, inspect ball joints, etc.). Furthermore, the manufacturer requires these services are performed at the specific time and an authorized or certified dealership. The adherence to vehicle maintenance can determine its longevity and reliability. Even with the importance of automotive maintenance, it remains one of the most neglected areas of vehicle ownership.

The problem of decreased vehicle lifetime due to non-compliance with scheduled automotive maintenance has been recognized for many years; and while numerous solutions have been proposed, none of them adequately addresses the problem.

SUMMARY OF THE INVENTION

The present invention provides a method and system that increases the usable lifetime of a vehicle through compliance with the scheduled maintenance and repair of the vehicle drivetrain. Vehicle maintenance requires the attention of various parties or team members: the provider, the user and the maintenance personnel. More specifically, the present invention addresses the problem of decreased vehicle lifetime due to noncompliance with scheduled automotive maintenance by providing a strong incentive for all parties involved in vehicular maintenance to comply with the maintenance requirements of the vehicle. The method and system of the present invention includes incentives for each and every member of the overall vehicle maintenance team.

In accordance with the present invention, a method and system are provided for increasing the usable lifetime of a new vehicle by allocating sales and maintenance incentives along the entire maintenance cycle, e.g., from sale, to use, to repair and even to new vehicle purchase. For example, a new vehicle is obtained from a vehicle dealership for a certain price; a portion of the sales price paid for the new vehicle is retained to fund future maintenance requirements. Next, compliance requirements for vehicle service is required to maintain access to the agreed-upon vehicular maintenance, e.g., as recommended by the manufacturer for new vehicles, wherein each service is performed by the dealership and repairing one or more covered parts when broken.

As such, the present invention provides a method of increasing the usable life of a new vehicle (e.g., a car, a truck, work vehicle, a SUV, a recreation vehicle, a boat, a motorcycle or a plane) including providing a warranty for the life of the new vehicle to a user, providing a maintenance schedule for the new vehicle to the user and repairing a mechanical breakdown of one or more covered parts at an authorized facility with a minimal cost to the user whenever the warranty has not been voided by an occurrence of a trigger event, the new vehicle has been routinely examined by the authorized facility, and all maintenance of the new vehicle specified in the maintenance schedule has been performed at the authorized facility.

The method of the present invention may also includes reimbursing the user, less the minimal cost, for a cost of repairing the mechanical breakdown of the one or more covered parts at another facility whenever the repairs cannot be made at the authorized facility, the warranty has not been voided by an occurrence of a trigger event, the new vehicle has been routinely examined by the authorized facility, all maintenance of the new vehicle specified in the maintenance schedule has been performed at the authorized facility, and one or more conditions are satisfied.

The present invention also provides a system including one or more input/output devices, one or more data storage devices that contain information about a user of a new vehicle, maintenance of the new vehicle and repair of the new vehicle and one or more processors communicably coupled to the data storage device(s) and input/output device(s), the processor(s) maintaining the information, determining whether the information satisfies one or more conditions of a warranty for the life of the new vehicle to the user, and authorizing a repair of a mechanical breakdown of one or more covered parts at an authorized facility with a minimal cost to the user whenever the one or more conditions are satisfied.

In addition, the present invention provides a computer program embodied on a computer readable medium including a code segment for maintaining information about a user of a new vehicle, maintenance of the new vehicle and repair of the new vehicle, a code segment for determining whether the information satisfies one or more conditions of a warranty for the life of the new vehicle to the user and a code segment for authorizing a repair of a mechanical breakdown of one or more covered parts at an authorized facility with a minimal cost to the user whenever the one or more conditions are satisfied.

The present invention also includes a method of increasing the usable life of a new vehicle including providing a warranty for the life of the new vehicle to a user, providing a maintenance schedule for the new vehicle to the user and repairing a mechanical breakdown of one or more covered parts at an authorized facility with a minimal cost to the user whenever the warranty has not been voided by an occurrence of a trigger event, the new vehicle has been routinely examined by the authorized facility, and all maintenance of the new vehicle specified in the maintenance schedule has been performed at the authorized facility.

The present invention is described in detail below with reference to the accompanying drawings.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The terminology used and specific embodiments discussed herein are merely illustrative of specific ways to make and use the invention and do not delimit the scope of the invention.

In accordance with the present invention, a method is provided that increases the longevity, performance and reliability of a vehicle, improves sales and customer loyalty. The present invention provides a method for an individual dealership to increasing the usable lifetime of a new vehicle which includes providing a new vehicle, retaining a portion of the sales price for the new vehicle by the individual dealership, servicing the new vehicle as recommended by the manufacturer, wherein each service is performed by the individual dealership and repairing one or more covered parts when broken for the lifetime of the vehicle. The lifetime of the vehicle is generally from the date of purchase of the vehicle to the time the owner transfers ownership of the vehicle to another or when the vehicle is no longer usable.

The present invention provides a method of increasing the usable life of a new vehicle (e.g., a car, a truck, work vehicle, a SUV, a recreation vehicle, a boat, a motorcycle or a plane) including providing a warranty for the life of the new vehicle to a user, providing a maintenance schedule for the new vehicle to the user and repairing a mechanical breakdown of one or more covered parts at an authorized facility with a minimal cost to the user whenever the warranty has not been voided by an occurrence of a trigger event, the new vehicle has been routinely examined by the authorized facility, and all maintenance of the new vehicle specified in the maintenance schedule has been performed at the authorized facility.

The present invention may also include reimbursing the user (e.g., a purchaser, a lessee, an individual, a family, a group, a business or other legal entity), less the minimal cost, for a cost of repairing the mechanical breakdown of the one or more covered parts at another facility whenever the repairs cannot be made at the authorized facility, the warranty has not been voided by an occurrence of a trigger event, the new vehicle has been routinely examined by the authorized facility, all maintenance of the new vehicle specified in the maintenance schedule has been performed at the authorized facility and one or more conditions are satisfied. The minimal cost may include no cost, a deductible amount or a predetermined amount.

The one or more conditions of a warranty for the life of the new vehicle may include that the warranty has not been voided by an occurrence of a trigger event, the new vehicle has been routinely examined by the authorized facility, and all maintenance of the new vehicle specified in a maintenance schedule has been performed at the authorized facility. The one or more conditions to be satisfied may also include a prior approval of the repair, providing evidence of the repair, submitting a reimbursement claim within a specified time period, an emergency in which the prior approval of the repair could not be obtained or a combination thereof.

The warranty is provided in exchange for a price. The price may be a fixed amount or a variable amount based on the user or the new vehicle. The price may be included in a price for the new vehicle or may be paid by the user or a provider of the new vehicle or the authorized facility or a combination thereof. The price is such that a provider of the warranty is projected to make a profit based on one or more parameters. The one or more parameters include a time period, the minimal cost received over the time period, a projected number of the warranties provided over the time period, a projected cost of repairing the new vehicles covered by the warranty over the time period, a projected amount of the cost of repairing the new vehicles covered by the warranty that is covered under one or more other warranties over the time period, a projected number of the warranties that will be void over the time period, an average age of the new vehicles covered by the warranty during the time period, or an average cost of repairing the new vehicles covered by the warranty during the time period.

The present invention may also include voiding the warranty upon the occurrence of one of the trigger events. The trigger event may be a commercial use of the new vehicle, a subsequent transfer or sale of the new vehicle, a failure to service the new vehicle at the authorized facility in accordance with the maintenance schedule, a failure to have the new vehicle routinely examined by the authorized facility, or any service or repair of the new vehicle is performed by an unauthorized facility. Furthermore, the trigger event may include accidents, any alteration to the vehicle or the parts, use of oversized tires or wheels, alteration to the vehicle not authorized by its manufacturer, failure of any part not covered by Warranty and/or Service Contract, accidental loss; any mechanical breakdown caused by accidents, collisions, upset damage, falling objects, theft, larceny, explosions, lightning, earthquakes, fire, windstorms, hail, water, floods, sub-freezing temperatures, malicious mischief, vandalism, civil commotion, riots, wars, terrorists acts; the repair or replacement of a covered part by any manufacturer warranty or any other coverage or any reason the manufacturer, distributor, seller or repairer of the vehicle will repair or replace the part at its expense or at a reduced cost; any claim if the vehicle's odometer, since the purchase date, has been altered, disconnected, is inoperable, or actual mileage cannot be documented, or reasonably estimated; if the vehicle is used for competitive driving or racing, police or emergency service, principally off-road use, snow removal, carriage of passengers for hire, commercial delivery, rental purposes, towing a trailer or another vehicle unless the vehicle is equipped as recommended by the manufacturer; any mechanical breakdown caused by misuse, abuse, negligence, improper towing, lack of maintenance; any mechanical breakdown caused by contamination, overheating, lack of fuel or lubricants, lack of oil viscosity, sludge, restricted oil flow; the need to repair or replace a covered part arising or resulting from the use of the vehicle outside of the United States, its territories or possessions or Canada; hazardous waste disposal charges, storage or freight charges, adjustments, court charges, shop supplies and correction of rattles/squeaks/wind noise/odors/water leaks; any consequential, secondary damages or reasonable costs suffered as a result of the need to repair or replace a part; liability for damage to property, injury or death of any person arising out of the operation, maintenance or use of the vehicle whether or not related to the covered part.

Part that is not specifically listed as covered parts include, but not limited to: brake linings, brake drums and rotors, disc brake pads, ABS component parts, standard transmission clutch components, air bags, solar powered devices, hinges, glass, lenses, sealed beams, trim, moldings, door handles, lock cylinders, tires, batteries, light bulbs, upholstery, paint, bright metal, head bolts, freeze plugs, exhaust systems, shock absorbers, rust and rust damage, audio, security or other systems not factory installed, work such as front-end alignment or wheel balancing, constant velocity joint boots, safety restraint systems, cellular phones, televisions VCRs, electronic transmitting devices, radar detectors, appliances, navigation/near object avoidance systems, vinyl and convertible tops; burnt valves oil ring, the correction of oil consumption, any repairs for reduction in engine efficiency that must be performed on the vehicle; any maintenance on the vehicle; any personal expenses arising because the vehicle is not available for use; damages caused to the engine resulting from the ingestion of water through the engine intake system (commonly referred to as water ingestion). However, the present invention is not a Warranty Agreement and not a policy of insurance.

The mechanical breakdown may include a failure of the covered part due to faulty workmanship or materials supplied by a manufacturer or distributor of the new vehicle, or gradual reduction in operating performance as a result of normal wear and tear, or a combination thereof. The one or more covered parts may not be covered by a manufacturer's warranty, and extended warranty, a third-party warranty or a combination thereof. Furthermore, the one or more covered parts may include a portion drivetrain system. The drivetrain system may include an engine, a transmission, a transaxle or a drive axle.

The new vehicle is to be routinely examined by the authorized facility, and all maintenance of the new vehicle specified in the maintenance schedule performed at the authorized facility. The authorized facility may be a provider of the new vehicle, a dealership, a specific facility, a member of a specific network or group or a facility approved by the provider or dealership.

The present invention may also include advertising the warranty in order to increase sales of the new vehicle. The present invention may increases sales of new vehicles, increases a life of a drivetrain of the new vehicle, increases customer satisfaction, increases customer loyalty, increases customer compliance with the maintenance schedule, increases revenues for a provider of the new vehicle or a combination thereof.

The present invention also provides a system including one or more input/output devices, one or more data storage devices that contain information about a user of a new vehicle, maintenance of the new vehicle and repair of the new vehicle and one or more processors communicably coupled to the data storage device(s) and input/output device(s), the processor(s) maintaining the information, determining whether the information satisfies one or more conditions of a warranty for the life of the new vehicle to the user, and authorizing a repair of a mechanical breakdown of one or more covered parts at an authorized facility with a minimal cost to the user whenever the one or more conditions are satisfied.

At least a portion of the system may be located within the new vehicle, a provider of the new vehicle, the authorized facility or a third-party facility. This portion may a removable module that may be read by an external reader, a module that communicates wirelessly with an external reader, a module that communicates when connected to an external reader.

In some embodiments, the portion of the system located within the new vehicle may be a module that may be connected to a device to display the information. The module may be a removable device that is removed and read by an external reader, e.g., disk, box, hard drive, chip or the like. The module may also be integrated into the vehicle with connections for connecting an external display. The portion of the system located within the new vehicle may also include an in-car display, which communicates information. In other embodiments, all of system may be located within the new vehicle, a provider of the new vehicle, the authorized facility or a third-party facility.

The system may store the information on a device within the vehicle to be read by an external reader, e.g., a hand held scanner, computer, or similar device. The system may also include a wired or wireless connection to allow communication with an external reader. The connection may be in the form of a RFID, laser, bar codes, wired or wireless connection or combinations thereof.

The one or more data-storage devices may contain information about a user of a new vehicle (e.g., ownership), maintenance of the new vehicle, compliance with scheduled maintenance, maintenance history, repair history, repair location, examination history and repair of the new vehicle.

Thus, allowing the information to be stored in a readily accessible location, whereby the information is easily upgradeable and conveniently located.

Furthermore, the system may include a network, which links multiple locations together. For example, several dealerships may be linked to a central system so that all information is located at the central location. Thus, allowing the storage of information about a user of a new vehicle, maintenance of the new vehicle and repair of the new vehicle at a central location that may be accessed from a variety of network locations. For example, the network may store the information on a central office computer and allow access to this information by computers of the individual members.

Additionally, the networked system allows decisions to be made at a central location and accessed by the members of the network. The system may include a network that evaluates the information at the central location and communicates that information to the members of the network. The information evaluated may include the determinations of trigger event, determinations of whether the information satisfies one or more conditions of a warranty, authorization, cost, deductible amount, maintenance schedule, examination schedule and combinations thereof may be made at the central location and relayed to the individual locations.

The network system may also be used to connect smaller entities. Therefore, the network system allows decisions to be made at a central location and accessed by the members of the network. For example, a number of small independent dealers may be networked together.

Additionally, the present invention may be used at the manufacturing level to provide an incentive to dealerships and/or consumers. The manufacturer and dealerships may be linked to a central system so that the information for all dealerships is located at the central location. Thus, allowing the storage of information about a user of a new vehicle, maintenance of the new vehicle and repair of the new vehicle at a central location that may be accessed from a variety of network locations. Additionally, the determinations of trigger event, determinations of whether the information satisfies one or more conditions of a warranty, authorization, cost, deductible amount, maintenance schedule, examination schedule and combinations thereof may be made at the central location and relayed to the individual dealerships. The networked system allows decisions to be made at a central location (e.g., manufacturer) and accessed by the members of the network (e.g., dealerships).

The network system may maintain the information, determine whether the information satisfies one or more conditions of a warranty for the life of the new vehicle to the user, authorizing a repair of a mechanical breakdown of one or more covered parts at an authorized facility with a minimal cost to the user whenever the one or more conditions are satisfied, determine a price in exchange for the warranty such that a provider of the warranty is projected to make a profit based on one or more parameters, communicate the information to the members of the network.

The one or more parameters used to project a profit may include a time period, the minimal cost received over the time period, a projected number of the warranties provided over the time period, a projected cost of repairing the new vehicles covered by the warranty over the time period, a projected amount of the cost of repairing the new vehicles covered by the warranty that is covered under one or more other warranties over the time period, a projected number of the warranties that will be void over the time period, an average age of the new vehicles covered by the warranty during the time period, or an average cost of repairing the new vehicles covered by the warranty during the time period.

In addition, the present invention provides a computer program embodied on a computer readable medium including a code segment for maintaining information about a user of a new vehicle, maintenance of the new vehicle and repair of the new vehicle, a code segment for determining whether the information satisfies one or more conditions of a warranty for the life of the new vehicle to the user, and a code segment for authorizing a repair of a mechanical breakdown of one or more covered parts at an authorized facility with a minimal cost to the user whenever the one or more conditions are satisfied.

The computer program may be located in the vehicle, integrated into the vehicle system, located externally to the vehicle or combinations thereof. The computer program may be stored on a device within the vehicle. The computer program may direct the output to an internal display or an external reader, e.g., a hand held scanner, computer, palm device, handheld computer or similar device. The computer program may be communicated through a wired or wireless connection to allow communication with an external reader or computer. The connection may be in the form of a RFID, wireless connection or combinations thereof.

The one or more conditions evaluated by the code segment of the computer program may include the warranty has not been voided by an occurrence of a trigger event, the new vehicle has been routinely examined by the authorized facility, and all maintenance of the new vehicle specified in a maintenance schedule has been performed at the authorized facility.

The computer program may further include a code segment for determining a price in exchange for the warranty such that a provider of the warranty is projected to make a profit based on one or more parameters. The one or more parameters may include a time period, the minimal cost received over the time period, a projected number of the warranties provided over the time period, a projected cost of repairing the new vehicles covered by the warranty over the time period, a projected amount of the cost of repairing the new vehicles covered by the warranty that is covered under one or more other warranties over the time period, a projected number of the warranties that will be void over the time period, an average age of the new vehicles covered by the warranty during the time period, or an average cost of repairing the new vehicles covered by the warranty during the time period.

Figure 1:
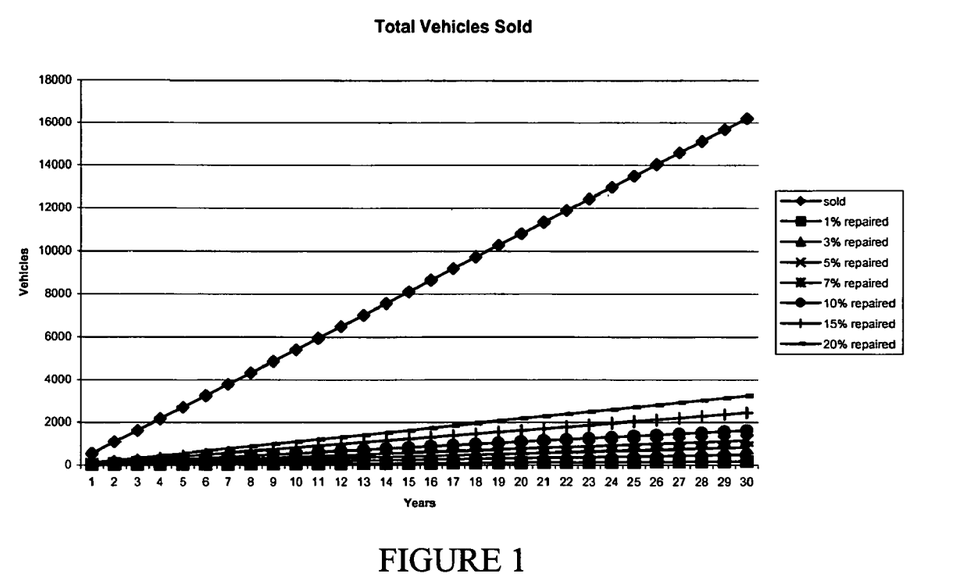
FIG. 1 is a graph representing the vehicle sales over the possible lifetime of a vehicle assuming a 30-year lifetime.

FIG. 1 is a graph representing the vehicle sales over the possible lifetime of a vehicle assuming a 30-year lifetime. The graph assumes a constant sale rate of 45 vehicles per month, with no increase in sales as a result of the drivetrain repairs for life. The graph displays the total number of vehicles sold over the 30-year period. The graph also displays the number of vehicles that may need repair over the 30-year period, from a low of 1% of the total number of vehicles sold to an unrealistic 20% of the total number of vehicles sold.

Figure 2:
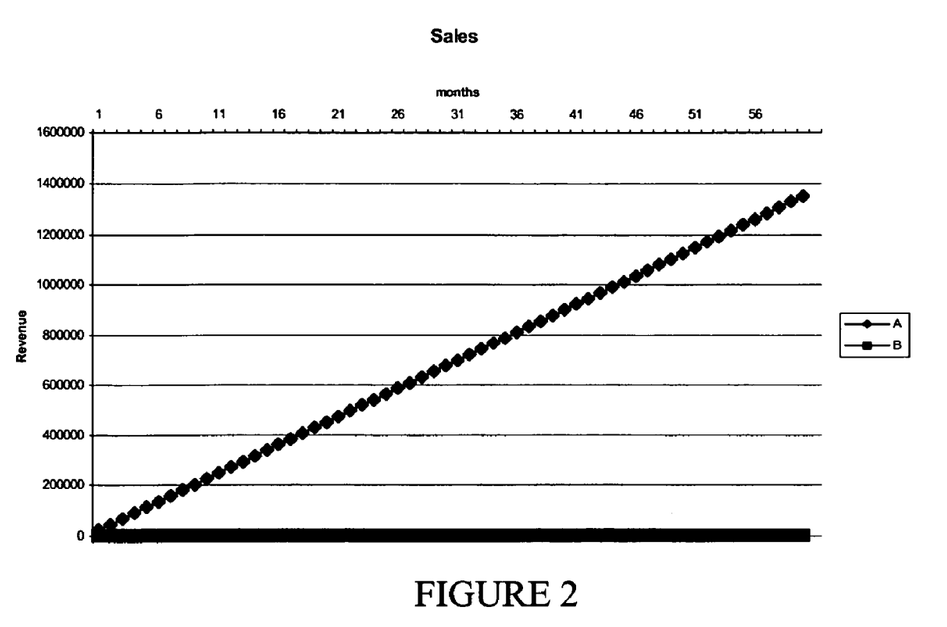
FIG. 2 is a graph of the expected returns based on the present invention.

FIG. 2 represents the expected returns based on the present invention. Line A represents the expected returns based on constant vehicles sales of 45 per month and a 500-dollar portion retained from the sale of each vehicle. Line B represents the expected returns, not employing the present invention, based on a constant 45 vehicles sold per month without any portion retained from the sale of each vehicle. The graph displays an increase in revenue from the retained portion; however, the graph does not take into account any expenditure for covered repairs. Assuming there is full compliance with the maintenance and examination of all sold vehicles.

Figure 3:
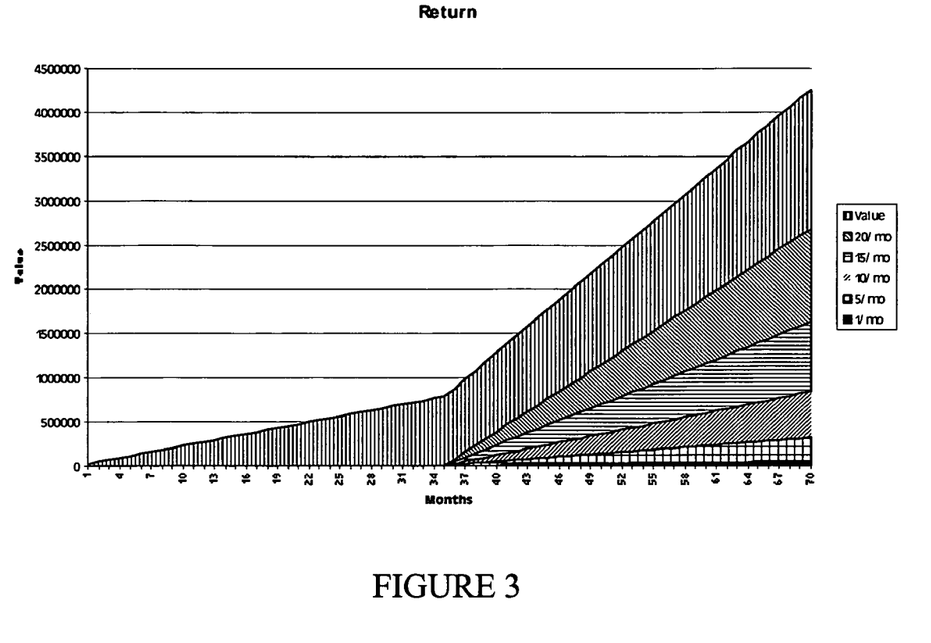
FIG. 3 is a graph that represents the expected returns based on the present invention taking in to account expenditures for covered repairs.

FIG. 3 is a graph that represents the expected returns based on the present invention taking in to account expenditures for covered repairs. This graph represents the expected returns based on the present invention assuming 45 vehicles sold per month for 70 months and a 500-dollar portion retained from the sale of each vehicle. In this example, the graph displays the vehicle is covered by a manufacturer's warranty for 36 months. As a result, the dealership may not be required to repair the drivetrain of the vehicle for the first 36 months, and all revenue is retained. After the end of the manufacturer's warranty period, the amount of the return will depend on the number of vehicles needing repairs. The value line represents the total revenue obtained from the retained portion of the vehicle sales. The remaining lines represent the expenditures for repairs depending on the number of vehicles repaired per month, e.g., 1, 5, 10, 15 or 20 vehicles repaired per month and an average of 1500 dollars per repair. The difference (e.g., area) between the value and the expenditures for repairs is the amount of revenue to the dealership. Assuming all vehicles comply with the maintenance and examination requirements.

Figure 4:
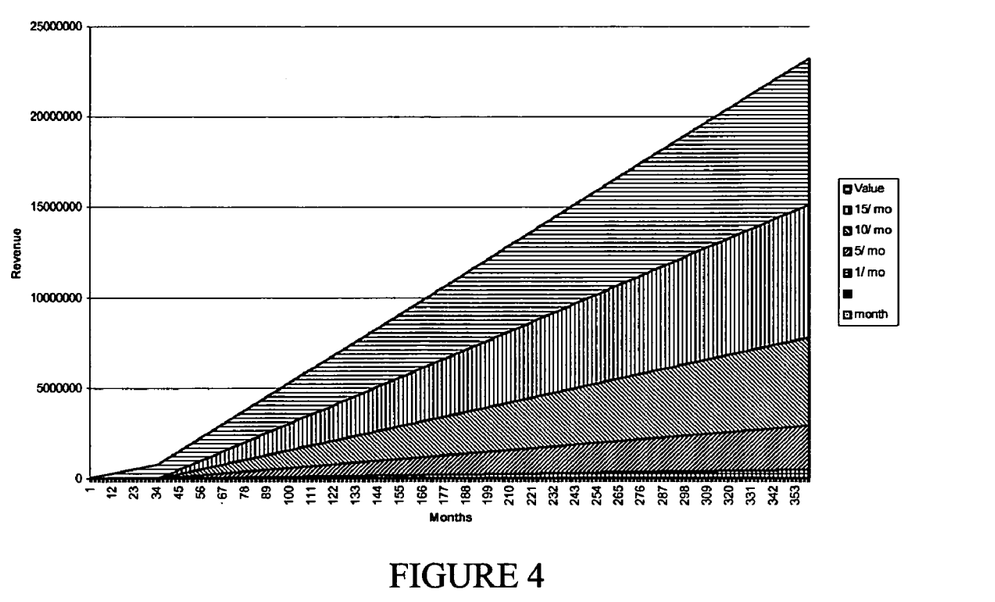
FIG. 4 is a graph of the expected returns based on the present invention taking in to account expenditures for covered repairs.

FIG. 4 is a graph of the expected returns based on the present invention taking in to account expenditures for covered repairs. This graph represents the expected returns based on the present invention assuming 45 vehicles sold per month for 30 years and a 500-dollar portion retained from the sale of each vehicle. In this example, a manufacturer's warranty covers the vehicle for 36 months. As a result, the dealership may not be required to repair the drivetrain of the vehicle for the first 36 months, thus all revenue is retained. After the end of the manufacturer's warranty period, the amount of return will depend on the number of repairs made to the sold vehicles. The value line represents the total revenue obtained from the retained portion of the vehicle sales. The remaining lines represent the expenditures for repairs depending on the number of vehicles repaired per month, e.g., 1, 5, 10, 15 or 20 vehicles repaired per month and an average of 1500 dollars per repair. The difference (e.g., area) between the value and the expenditures for repairs is the amount of revenue to the dealership. The graphs assume compliance with the maintenance and examination of the vehicle is 100 percent.

Figure 5:
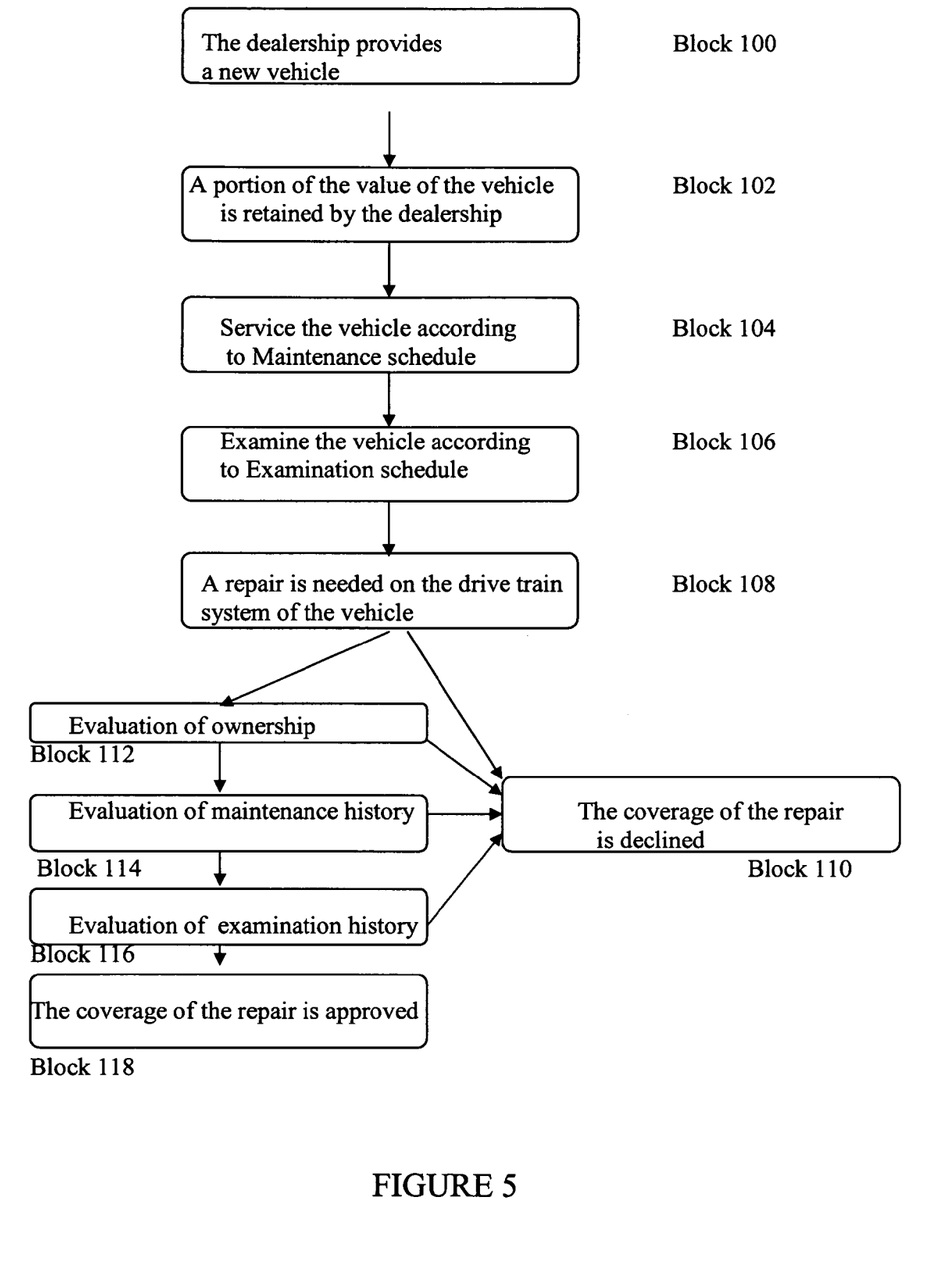
FIG. 5 illustrates the process flow of one embodiment of the present invention.

Now with reference to FIG. 5, a process flow of one embodiment of the method of the present invention. In Block 100, the dealership sells a new vehicle. Once the vehicle is sold, proceed to Block 102 where a portion of the value of the vehicle is retained by the dealership. The portion retained may be an amount added to the invoice price of the vehicle, an amount paid by the dealership, an amount paid by the individual or combinations thereof. The new vehicle is then serviced, Block 104, and examined, Block 106, at the dealership in accordance with the maintenance and examination schedule provided by the dealership and/or the manufacturer. When a repair is need in Block 108 it is necessary to determine if the repair is on the drivetrain system of the vehicle. If the repair is not on a drivetrain system, the repair is declined in Block 110. If the repair is on a drivetrain system, the ownership is determined in Block 112. In Block 112, if the owner is not the original owner then the repair is declined in Block 110. In Block 112, if the owner is the original owner then the maintenance history is examined in Block 114. Block 114 compares the maintenance history of the new vehicle as recommended by the manufacturer to the actual maintenance performed and the location of the maintenance was performed. If the vehicle has been maintenance at the dealership according to the manufacturer's maintenance schedule, then proceed to Block 116. If the vehicle is not serviced at the dealership or the vehicle is not serviced according to the manufacturer's maintenance schedule then the repair is declined in Block 110. In Block 116, the compliance with the required vehicle examination is determined. If the vehicle examination history is compared is in according to the dealership's examination schedule then the repair of the one or more covered parts is approved in Block 118. If the vehicle is not examined by the dealership in accordance with, the dealership's examination schedule then the repair is declined in Block 110. This process is repeated for each repair.

Figure 6:
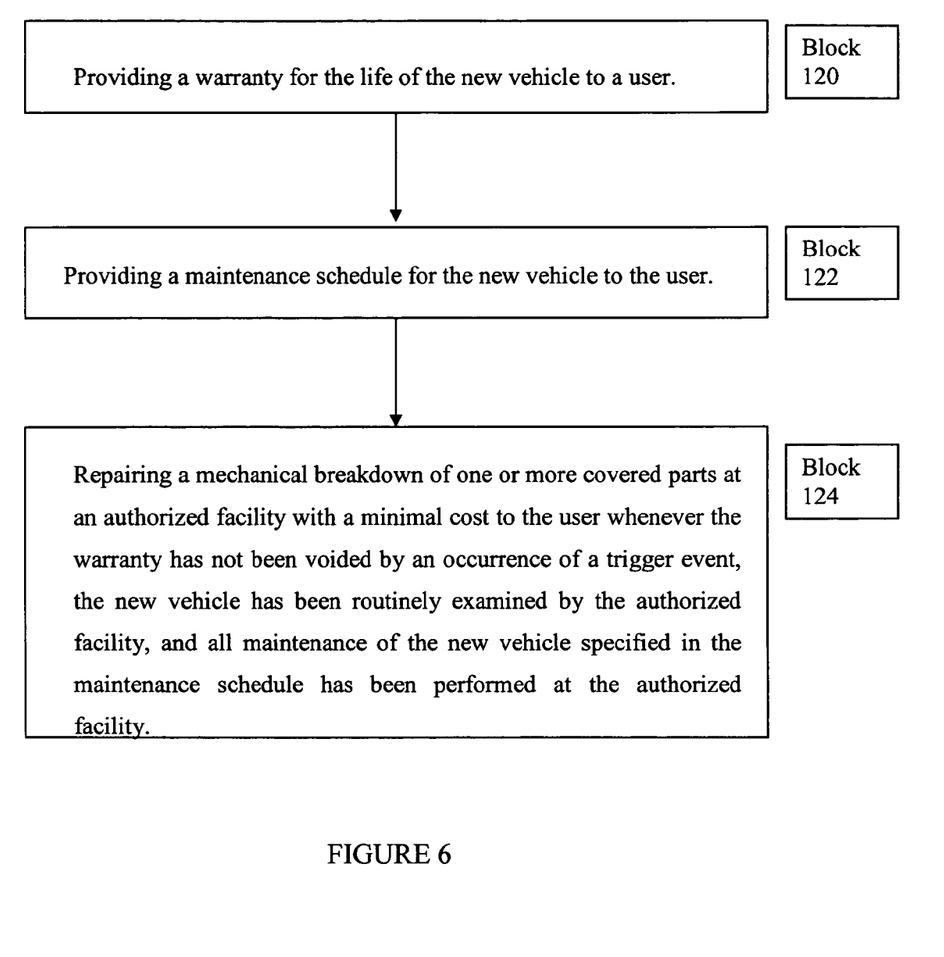
FIG. 6 illustrates the process flow of another embodiment of the present invention.

FIG. 6 illustrates the process flow of another embodiment of the present invention. In Block 120, a warranty for the life of the new vehicle is provided to a user. A maintenance schedule for the new vehicle is then provided to the user in Block 122. In Block 124 A mechanical breakdown of one or more covered parts is repaired at an authorized facility with a minimal cost to the user whenever the warranty has not been voided by an occurrence of a trigger event, the new vehicle has been routinely examined by the authorized facility, and all maintenance of the new vehicle specified in the maintenance schedule has been performed at the authorized facility In accordance with the present invention, a method is provided that increases the usable lifetime of a new vehicle including providing a new vehicle at a dealership, retaining a portion of the sales price paid for the new vehicle, servicing the new vehicle as recommended by the manufacturer, wherein each service is performed by the dealership, and repairing one or more covered parts when broken. The vehicle may be a consumer vehicle, e.g., a car, a truck, a motorcycle, a chopper, a boat, an airplane, a sport utility vehicle, a sport utility truck, a large cargo vehicle, a so-called eighteen wheeler and like vehicles. Other embodiments of the present invention may be designed for commercial vehicles or recreational vehicles, e.g., a motor home, a boat, a motorcycle and a plane. A vehicle may be provided through the sale of the vehicle, a gift of the vehicle, an auction of the vehicle, the purchase of the vehicle by an individual who places title in another individual, or any other manner, which transfers ownership.

The dealership may be a sales entity of any size from a solo establishment to a nationwide franchise. The dealership may sale any make and model of vehicle. Furthermore, the dealership may be an entity separate from the sales entity (e.g., a different department or entirely different company). For example, a separate company may be setup to cover a dealership selling different makes, e.g., Suzuki and GMC, Ford and Jaguar, Dodge and Mitsubishi, and the like.

The lifetime of the vehicle is generally from the date of purchase of the vehicle to the time the owner transfers ownership of the vehicle to another. The transfer of ownership may be through the sale of the vehicle to a third party, the gift of the vehicle to a third party, the transfer of ownership through trading the vehicle or combinations thereof. Additionally, the vehicle must be a new vehicle, e.g., the vehicle has not been titled previously. Other embodiments of the present invention may include vehicles that are not new, e.g., titled previously.

Generally, new vehicle have warranties that last for about 36,000 miles or 3 years (e.g., which ever comes first) from the date of the transfer of title. However, other manufactures may offer warranties lasting for either about 24,000 miles or 2 years or about 48,000 miles or 4 years from the date of the transfer of title. The warranty period depends on the manufacturer, the vehicle and the year of the car. Therefore, in some instances, the new vehicle repairs may be covered by a manufacturer's warranty. The manufacturer's warranty would cover the repair and not at a cost to the dealership. As a consequence of the manufacturer's warranty, no repairs in accordance with the present invention will be required until the warranty has expired. Furthermore, by encouraging strict compliance with the maintenance requirements of the vehicle, even those repairs will be limited or reduced in number and/or severity. In addition, the compliance with vehicle maintenance may reduce customer dissatisfaction with a particular dealership or make by providing for the early identification, remediation and/or replacement of so-called vehicle lemons, now the subject of numerous local and state regulations.

In other instances, the vehicle may be subject to a third party warranty or an extended warranty. These different layers of protection, vehicle warranty, third-party warranty and the vehicle maintenance program of the present invention may not only be overlapping, but will provide the user with improved and/or enhanced vehicle performance and customer care. Therefore, in some instances, the third party warranty may cover the vehicle repairs that may or may not fall within the regular manufacturer's vehicle maintenance warranty. In those instances, the repair would be made under the third party warranty and not at a cost to the dealership. As a consequence of the third party warranty, no repairs in accordance with the present invention will be required until the warranty has expired. In some instances, the third party warranty or extended warranty may not cover the part and would thus compliment, or be complemented by, the present invention.

The present invention provides that a portion of the sales price paid for the new vehicle will be retained. The retained portion may even be invested to increase its value and enhance the overall value of the program. The portion of the sales price may be added to the invoice price of the vehicle, wherein the customer may be unaffected by this additional portion, e.g., portion is added to the vehicle invoice and it is rare that an individual will purchase the vehicle at the invoice price. The dealership may provide for the portion of the price of the vehicle, e.g., the portion is taken from the dealership revenue. Additionally or alternatively, the consumer may provide the portion of the price, e.g., the portion may be an option added to the vehicle. The portion retained may be about 500 dollars per vehicle, however, other applications may retain different amounts of the price of the vehicle depending on the make and model of the vehicle, maintenance history of the make and model or even if the make and/or model is new. In one example, the portion may be between about 200 and 500 and in another example the value may be between 500 and 750 or about 750 and 1000 dollars. Additionally, the portion may be more than 1000 dollars.

The present invention provides the new vehicle must be serviced as recommended by the manufacturer and that each service is performed by the dealership or other pre-authorized location for service. The manufacturer may provide the service schedule in the owner's manual, however, the service schedule may be provided in the form of a service bulletin, service manual or other documentation provided by the manufacturer or the dealership. The vehicle is required to have all services performed at the dealership. In most instances, the dealership will be the dealership that original sold the vehicle; however, the dealership may be an authorized dealership, an approved dealership or a dealer that is part of a specific franchise. In other instances, the dealership may grant approval or authorization for a service center to perform the repairs. In instances where the repairs are not approved, the dealership may not be required to reimburse for the repairs.

The vehicle must also return to the dealership at regular intervals for examination. The examination must be within about six months intervals from the date of purchase. This examination ensures the status of the vehicle, provides for detection of problems and potential malfunctions. Therefore, the maintenance is performed and the longevity of the vehicle is increased. In other embodiments, the vehicle may be returned to the dealership for examinations no less than once every 180, 190, 200, 210 or 220 days from the date of purchase. The examination period may also include a grace period, which may range from a few days to a few weeks or may be measured in miles accumulated.

The present invention provides for vehicle repairs to the drivetrain for the lifetime of the vehicle. When the vehicle has received, the routine maintenance and examinations performed at the dealership. In instances where the maintenance is not performed, the examinations are not performed, both are not performed or not performed according to the schedule, the dealership may decline the repairs or refuse to repair the vehicle free of charge.

The covered parts of the present invention relate to the drivetrain system of the vehicle. The drivetrain system may include: an engine, a transmission, a transaxle and a drive axle. The engine may include an engine block, one or more cylinder heads, one or more internally lubricated parts, one or more pistons, one or more piston rings, one or more pins, one or more cylinder sleeves, a crank shaft, one or more pulleys, one or more main bearings, one or more main bearing caps, one or more main bearing bolts, one or more connecting rods, one or more rod bearings, one or more rod bearings caps, one or more rod bearings bolts, one or more cam shafts, one or more cam shaft bearings, one or more buttons, one or more plugs, one or more timing gears, one or more timing chain or belts, one or more rocker arms, one or more rocker arm pivots, one or more shafts, one or more bushings, one or more intake valves, one or more exhaust valves, one or more valve springs, one or more valve guides, one or more adjusters, one or more retainers one or more valve seats, one or more push rods, one or more lifters, one or more intake manifolds, one or more exhaust manifolds, one or more balance shafts, one or more water pumps, one or more fuel pumps, one or more thermostats, an oil pump, a cover, one or more gears, a pressure release valve, a rotor housing, one or more rotors, one or more shims, one or more silence shafts, one or more internal fasteners, one or more nuts, one or more bolts, one or more seals, one or more gaskets and combinations thereof.

The transmission and transaxle may include: one or more rings, one or more pinion gears, an oil pump, a cover, one or more gears, a housing, one or more vanes, a torque converter, one or more valve bodies, one or more throttle valves, a valve pack, a governor, one or more gears, a gear cover, a parking gear, a pawl, a roll pin, one or more sprags, one or more sprockets, a chain, one or more springs, one or more shafts, one or more pressure regular valves, one or more pressure switches, one or more solenoids, one or more bands, an automatic transmissions/transaxle clutch, one or more gloves, one or more pistons, one or more steel plates, one or more planetary gears, one or more sun gears, one or more servos, one or more blockers, one or more synchronizer hubs, a key, one or more bearings, one or more bushings, one or more supports, one or more shafts, one or more control rings, one or more yolks, an extension housing, one or more speedometer drive gears, one or more accumulators, one or more rings, one or more adjusters, one or more internal fasteners, one or more nuts and bolts, a shift cover and one or more forks, a seal, a gaskets and combinations thereof.

The drive axle may include: one or more differential/axle housings, an axle flange, ring and pinion gear/carrier assembly, one or more spider gears and one or more bearings, one or more pins, one or more retainers, one or more positraction clutches, one or more plates, one or more springs, a cover, and a transaxle case.

The present invention also provides a method for increasing new vehicles sales by advertising a lifetime repair program. The sale of new vehicles increases due to the lifetime repair of the drivetrain for the vehicle. Advertising may be used to inform the consumers of the repairs to the drivetrain of the vehicle for the life of the vehicle or the duration of ownership of the original owner. Consumers will recognize the security and value provided by the lifetime repair of the drivetrain of the vehicle and reinforces the consumer loyalty to the dealership with return purchases and increase the consumer's confidence and sales.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of increasing the usable life of a new vehicle comprising the steps of:
   providing a warranty for the life of the new vehicle to a user;
   providing a maintenance schedule for the new vehicle to the user; and
   repairing a mechanical breakdown of one or more covered parts at an authorized facility with a minimal cost to the user whenever the warranty has not been voided by an occurrence of a trigger event, the new vehicle has been routinely examined by the authorized facility, and all maintenance of the new vehicle specified in the maintenance schedule has been performed at the authorized facility.

2. A method of increasing the usable life of a new vehicle comprising the steps of:
   providing a warranty for the life of the new vehicle to a user;
   providing a maintenance schedule for the new vehicle to the user;
   repairing a mechanical breakdown of one or more covered parts at an authorized facility with a minimal cost to the user whenever the warranty has not been voided by an occurrence of a trigger event, the new vehicle has been routinely examined by the authorized facility, and all maintenance of the new vehicle specified in the maintenance schedule has been performed at the authorized facility; and
   reimbursing the user, less the minimal cost, for a cost of repairing the mechanical breakdown of the one or more covered parts at another facility whenever the repairs cannot be made at the authorized facility, the warranty has not been voided by an occurrence of a trigger event, the new vehicle has been routinely examined by the authorized facility, all maintenance of the new vehicle specified in the maintenance schedule has been performed at the authorized facility, and one or more conditions are satisfied.

3. The method of claim 2, wherein the one or more conditions comprise a prior approval of the repair, providing evidence of the repair, submitting a reimbursement claim within a specified time period, an emergency in which the prior approval of the repair could not be obtained or a combination thereof.

4. The method of claim 1, wherein the user is a purchaser, a lessee, an individual, a family, a group, a business or other legal entity.

5. The method of claim 2, wherein the warranty is provided in exchange for a price.

6. The method of claim 5, further comprising the step of determining the price such that a provider of the warranty is projected to make a profit based on one or more parameters.

7. The method of claim 6, wherein the one or more parameters comprises a time period, the minimal cost received over the time period, a projected number of the warranties provided over the time period, a projected cost of repairing the new vehicles covered by the warranty over the time period, a projected amount of the cost of repairing the new vehicles covered by the warranty that is covered under one or more other warranties over the time period, a projected number of the warranties that will be void over the time period, an average age of the new vehicles covered by the warranty during the time period, or an average cost of repairing the new vehicles covered by the warranty during the time period.

8. The method of claim 5, wherein the price is a fixed amount or a variable amount based on the user or the new vehicle.

9. The method of claim 5, wherein the price is included in a price for the new vehicle or at least a portion is paid by the user or a provider of the new vehicle or the authorized facility or a combination thereof.

10. The method of claim 1, wherein the maintenance schedule is specified by a manufacturer of the new vehicle, the authorized facility or a combination thereof.

11. The method of claim 1, wherein the minimal cost comprises no cost, a deductible amount or a predetermined amount.

12. The method of claim 1, further comprising the step of voiding the warranty upon the occurrence of one of the trigger events.

13. The method of claim 1, wherein the trigger event is a commercial use of the new vehicle, a subsequent transfer or sale of the new vehicle, a failure to service the new vehicle at the authorized facility in accordance with the maintenance schedule, a failure to have the new vehicle routinely examined by the authorized facility, or any service or repair of the new vehicle is performed by an unauthorized facility.

14. The method of claim 1, wherein the mechanical breakdown comprises a failure of the covered part due to faulty workmanship or materials supplied by a manufacturer or distributor of the new vehicle, or gradual reduction in operating performance as a result of normal wear and tear, or a combination of 2 or more thereof.

15. The method of claim 1, wherein the authorized facility is a provider of the new vehicle, a dealership or a facility approved by the provider or dealership.

16. The method of claim 1, wherein the warranty is in addition to a manufacturer's warranty, an extended warranty, a third-party warranty or a combination thereof.

17. The method of claim 1, wherein the one or more covered parts are not covered by a manufacturer's warranty, and extended warranty, or a third-party warranty.

18. The method of claim 1, wherein the one or more covered parts comprise a portion drivetrain system.

19. The method of claim 18, wherein the drivetrain system comprises an engine, a transmission, a transaxle or a drive axle.

20. The method of claim 1, wherein the routine examination of the new vehicle occurs approximately once every six months.

21. The method of claim 1, wherein the new vehicle is selected from the group of a car, a truck, a SUV, a recreation vehicle, a boat, a motorcycle and a plane.

22. The method of claim 1, further comprising the step of advertising the warranty in order to increase sales of the new vehicle.

23. The method of claim 1, wherein the method increases sales of the new vehicles, increases a life of a drivetrain of the new vehicle, increases customer satisfaction, increases customer loyalty, increases customer compliance with the maintenance schedule, increases revenues for a provider of the new vehicle, or a combination of 2 or more thereof.

24. A warranty provided in accordance with the method of claim 1.

25. A system comprising:
   one or more input/output devices;
   one or more data storage devices that contain information about a user of a new vehicle, maintenance of the new vehicle and repair of the new vehicle; and
   one or more processors communicably coupled to the data storage device(s) and input/output device(s), the processor(s) maintaining the information, determining whether the information satisfies one or more conditions of a warranty for the life of the new vehicle to the user, and authorizing a repair of a mechanical breakdown of one or more covered parts at an authorized facility with a minimal cost to the user whenever the one or more conditions are satisfied.

26. A system comprising:
   one or more input/output devices;
   one or more data storage devices that contain information about a user of a new vehicle, maintenance of the new vehicle and repair of the new vehicle; and
   one or more processors communicably coupled to the data storage device(s) and input/output device(s), the processor(s) maintaining the information, determining whether the information satisfies one or more conditions of a warranty for the life of the new vehicle to the user, and authorizing a repair of a mechanical breakdown of one or more covered parts at an authorized facility with a minimal cost to the user whenever the one or more conditions are satisfied, wherein the one or more conditions comprise the warranty has not been voided by an occurrence of a trigger event, the new vehicle has been routinely examined by the authorized facility, and all maintenance of the new vehicle specified in a maintenance schedule has been performed at the authorized facility.

27. The system of claim 25, wherein at least a portion of the system is located within the new vehicle, a provider of the new vehicle, the authorized facility or a third-party facility.

28. The system of claim 25, wherein all of system is located within the new vehicle, a provider of the new vehicle, the authorized facility or a third-party facility.

29. The system of claim 26, wherein the one or more processors determine a price in exchange for the warranty such that a provider of the warranty is projected to make a profit based on one or more parameters.

30. The system of claim 29, wherein the one or more parameters comprises a time period, the minimal cost received over the time period, a projected number of the warranties provided over the time period, a projected cost of repairing the new vehicles covered by the warranty over the time period, a projected amount of the cost of repairing the new vehicles covered by the warranty that is covered under one or more other warranties over the time period, a projected number of the warranties that will be void over the time period, an average age of the new vehicles covered by the warranty during the time period, or an average cost of repairing the new vehicles covered by the warranty during the time period.

31. A computer program embodied on a computer readable medium comprising:
   a code segment for maintaining information about a user of a new vehicle, maintenance of the new vehicle and repair of the new vehicle;
   a code segment for determining whether the information satisfies one or more conditions of a warranty for the life of the new vehicle to the user;
   a code segment for authorizing a repair of a mechanical breakdown of one or more covered parts at an authorized facility with a minimal cost to the user whenever the one or more conditions are satisfied.

32. The computer program of claim 31, wherein the one or more conditions comprise the warranty has not been voided by an occurrence of a trigger event, the new vehicle has been routinely examined by the authorized facility, and all maintenance of the new vehicle specified in a maintenance schedule has been performed at the authorized facility.

33. The computer program of claim 31, further comprising a code segment for determining a price in exchange for the warranty such that a provider of the warranty is projected to make a profit based on one or more parameters.

34. The computer program of claim 33, wherein the one or more parameters comprises a time period, the minimal cost received over the time period, a projected number of the warranties provided over the time period, a projected cost of repairing the new vehicles covered by the warranty over the time period, a projected amount of the cost of repairing the new vehicles covered by the warranty that is covered under one or more other warranties over the time period, a projected number of the warranties that will be void over the time period, an average age of the new vehicles covered by the warranty during the time period, or an average cost of repairing the new vehicles covered by the warranty during the time period.

* * * * *